United States Patent Office 2,907,743
Patented Oct. 6, 1959

2,907,743

RESINOUS POLYHYDRIC PHENOLS

Sylvan O. Greenlee, Racine, Wis., assignor to
S. C. Johnson & Son, Inc., Racine, Wis.

No Drawing. Application June 9, 1955
Serial No. 514,377

5 Claims. (Cl. 260—47)

This invention relates to a new class of resinous polyhydric phenols. More particularly, this invention relates to the product prepared by self-esterifying an aryloxy-substituted acid.

In the formulation of plasticized resin compositions, one of the greatest problems encountered is the manner of plasticizing and imparting air-drying or heat conversion characteristics while retaining other desired properties. According to conventional practice, the resin is compounded with one or more materials which contribute the plasticizing and/or drying characteristics. Since the resin and plasticizer or drying oil must be completely miscible with one another, certain other properties of the resin are sacrificed. For example, a formulator will choose a very soluble resin because of its miscibility even though the product is inferior with respect to toughness, chemical resistance or flexibility.

Important resin plasticizers are the drying oils, which contain the glycerides of unsaturated acids of 18 to 22 carbon atoms, and the simpler esters of such acids. These oils are highly desirable not only for plasticizing, but also for the conversion characteristics which they impart due to their unsaturation. The present compositions provide a means of chemically uniting in each molecule one or more plasticizing or converting groups which may be derived from such drying oils together with a residue capable of being treated to form valuable insoluble, infusible compositions.

Compounds capable of accomplishing the above ends are the self-esters derived from anhydroxyaryl-substituted aliphatic acid. Such compositions may be prepared, for example, by heating 4,4-bis(4-hydroxyphenyl)-pentanoic acid in the presence of acetic anhydride as illustrated by the following:

(I)

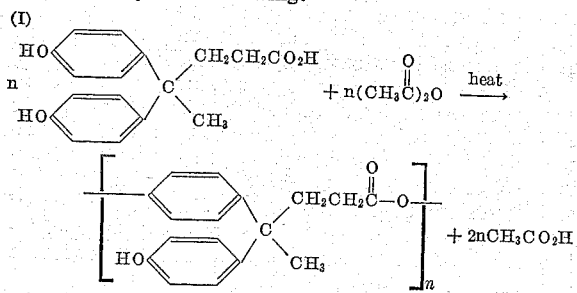

It is to be understood that the product of the illustrative reaction is only one of a mixture of materials actually produced. Whenever both hydroxyl groups of the aryloxy-substituted acid are esterified, a branched structure, rather than the illustrated linear configuration, would result. The invention embraces esters containing any number of monomeric units. Thus in Equation I above, $n$ may represent any integer greater than 1. In compositions where $n$ is a value greater than about 15, the self-ester is ordinarily difficult to handle since the mass becomes solid, insoluble, and infusible and cannot be readily separated from by-products.

Further valuable variations in the type of composition obtained may be effected by varying the number of carboxyl groups esterified, resulting in resinous polyhydric phenols containing a desired amount of unreacted carboxylic acid. To illustrate this type of composition, the reaction between 2 molecules of 4,4-bis(4-hydroxyphenyl)-pentanoic acid results in an essentially resinous triphenolic acid.

(II)

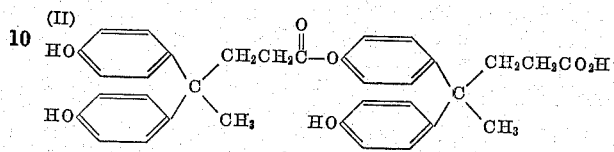

The aryloxy-substituted acid contemplated for use herein should have two hydroxyphenyl groups attached to a single carbon atom. The preparation of such an aryloxy acid is most conveniently carried out by condensing a keto-acid with the desired phenol. Experience in the preparation of bisphenol and related compounds indicates that the carbonyl group of the keto-acid must be located next to a terminal carbon atom in order to obtain satsifactory yields. Prior applications, Serial Nos. 464,607 and 489,300, filed October 25, 1954, and February 18, 1955, respectively, disclose a number of illustrative compounds suitable for use as the arloxy-substituted acid and methods of preparing the same. These materials, which are referred to for convenience as Diphenolic Acid or DPA, consist of the condensation products of levulinic acid and phenol, substituted phenols, or mixtures thereof. It is to be understood that the phenolic nuclei of the Diphenolic Acid may be substituted with any groups which will not interfere with the esterification reactions. For example, the nuclei may be alkylated with alkyl groups of from 1 to 5 carbon atoms as disclosed in my hereinbefore mentioned copending application Serial No. 489,300 or they may be halogenated.

The resinous polyhydric phenols are prepared by self-esterification of up to one-half the phenolic hydroxyl groups of Diphenolic Acid with the carboxyl group of other molecules of Diphenolic Acid. Partial esterification to give products having appreciable acid values, such as that represented by II above, may be carried out by heating at temperatures of from 190–275° C. under conditions whereby water of esterification is readily removed. The water removal may be facilitated by bubbling inert gas through the reaction mixture during esterification or by azeotropic distillation with a hydrocarbon solvent. Convenient methods of esterification of the phenolic hydroxyl groups involve heating the Diphenolic Acid in the presence of acetic anhydride in an amount equivalent to the extent of esterification desired. For example, if it is desired to self-esterifying approximately one-half of the carboxyl groups, one-half mol of acetic anhydride per mol of Diphenolic Acid should be used. If approximately complete self-esterification of the carboxyl groups is desired, at least 1 mol of acetic anhydride per mol of Diphenolic Acid should be used. Where more than the equivalent amount of acetic anhydride is used in the process, a portion of the phenolic hydroxyl groups not esterified by the carboxyl group of the Diphenolic Acid are acetylated. In some cases, it is desirable that a portion or even all of the phenolic hydroxyl groups not used in self-esterification be acetylated since the acetates are valuable in acid replacement reactions with high molecular weight acids to form high molecular weight esters. For example, 1 mol of a Diphenolic Acid might be treated with at least 2 mols of acetic anhydride to give complete self-esterification and also acetylation of the excess phenolic hydroxyl groups. This product could then be treated at high temperatures with undecylenic acid to replace the acetate groups, forming the undecylenic ester of the resinous polyhydric phenol.

The resinous polyhydric phenols may also be prepared by converting the carboxyl group of the Diphenolic Acid to an acid chloride which immediately reacts with the phenolic hydroxyl groups of the Diphenolic Acid. This reaction results in the liberation of HCl and takes place immediately upon conversion of the carboxyl group to the acid chloride. Incomplete esterification of the carboxyl group of the Diphenolic Acid may be effected by regulating the amount of acid chloride-forming reagent used in treatment of the Diphenolic Acid.

The following examples describe the preparation of the self-esters herein disclosed. Softening points as used herein were run by the Durrans' Mercury Method (Journal of Oil and Colour Chemists' Association, 12, 173–175 [1929]). Acid values as used herein are defined as the number of milligrams of potassium hydroxide equivalent to the free acid contained in a one-gram sample. Proportions expressed are parts by weight unless otherwise indicated.

EXAMPLE I

*Polyhydric phenol prepared by completely self-esterifying DPA*

A mixture of 286 parts of the Diphenolic Acid prepared from phenol and levulinic acid, 200 parts of glacial acetic acid, and 102 parts of acetic anhydride in a 3-neck flask provided with a thermometer, a mechanical agitator, and a reflux condenser was heated with continuous agitation raising the temperature to 130° C. over a period of about 20 minutes at which time removal of the acetic acid by distillation was begun. With continued agitation and removal of the acetic acid the temperature was increased to 212° C. over a period of 2 hours and held at 212–220° C. for 4½ hours, finally heating in the range of 220–240° C. for a period of 2 hours. During the last ½ hour of heating a water leg vacuum of around 30 mm. was applied to remove the last traces of acetic acid. The product had an acid value of 4.5 and a softening point of 137° C.

EXAMPLE II

*Polyhydric phenol prepared by the incomplete self-esterification of DPA*

A mixture of 286 parts of the Diphenolic Acid prepared from phenol and levulinic acid, 100 parts of acetic acid, 76½ parts of acetic anhydride was treated in a similar manner as in Example I to give a product having an acid value of 58 and a softening point of 120° C.

EXAMPLE III

*Polyhydric phenol prepared by the incomplete self-esterification of DPA*

The Diphenolic Acid prepared from phenol and levulinic acid was heated in an open reaction vessel with continuous agitation at 200–212° C. for a period of 5 hours to give a solid resin having an acid value of 110. Since the Diphenolic Acid used in the example had an acid value of 196, it is apparent that 44% of the carboxyl groups of the acid have been self-esterified.

The resinous polyhydric phenols described herein are particularly valuable in preparing synthetic drying compositions through esterification of the phenolic hydroxyl groups with unsaturated aliphatic acids containing 10 or more carbon atoms per molecule. Such acid residues chemically plasticize the resin and at the same time contribute unsaturation which is subject to polymerization on exposure to air or by the application of heat. Such heat-converting compositions, then, become valuable as coating compositions, adhesives, and molding resins. In the case of coatings, the esterified resin would normally be dissolved in an organic solvent and applied in thin films which may be converted to insoluble, infusible products by air-drying or by the application of heat. For adhesive applications, a similar compounding technique might be used or the products might be used free of solvent. In the case of molding objects, the resinous esters should normally be cured in the absence of organic solvents.

The following example illustrates one of the many different types of plasticized resin compositions which may be prepared from the resinous polyhydric phenols of this invention.

EXAMPLE IV

*Esterification of resinous polyhydric phenol of Example 1 with oleic acid*

A mixture of 57 parts of the polyhydric phenol and 25 parts of acetic anhydride in a 3-neck flask provided with a thermometer, a mechanical agitator, and reflux condenser was heated at 135° C. for a period of 45 minutes. To this mixture 51 parts of oleic acid were added. The reflux condenser was turned downward for collection of the distillate and inert gas was introduced. The continuously agitated mixture was raised to 220° C. and maintained at 220–250° C. for a period of 3 hours. During this time the acetic acid was collected. This product had an acid value of 3.9.

When dissolved in commercial xylol to a 30% nonvolatile content and treated with 0.03% cobalt drier (based on nonvolatiles), films of this product having 0.002" thickness air-dried in 15–20 minutes. After baking at 150° C. for ten minutes, the film was unaffected by immersion for 4 hours in boiling water or by 15 hours' immersion in 5% aqueous sodium hydroxide at room temperature.

While there are above disclosed but a limited number of embodiments of the product of this invention herein presented, it is possible to produce still other embodiments without departing from the inventive concept herein disclosed, and it is desired, therefore, that only such limitations be imposed on the appended claims as are stated therein, or required by the prior art.

What is claimed is:

1. A resinous polymer comprising the self-ester of a pentanoic acid consisting essentially of 4,4 bis(4-hydroxyaryl) pentanoic acid wherein the hydroxyaryl radical is a hydroxyphenyl radical and is free from substituents other than alkyl groups of from 1–5 carbon atoms, said resinous polymer containing not more than 15 pentanoic acid units self-condensed therein.

2. The composition of claim 1 wherein the pentanoic acid consists essentially of 4,4 bis(4-hydroxyaryl)-pentanoic acid wherein the hydroxyaryl radical is a hydroxyphenyl radical and is free from substituents other than alkyl groups of one carbon atom.

3. The composition of claim 1 wherein the pentanoic acid is 4,4 bis(4-hydroxyphenyl)pentanoic acid.

4. A method of preparing a new resinous polymer comprising self-esterifying a pentanoic acid at a temperature of from 190–275° C., said pentanoic acid consisting essentially of 4,4 bis(4-hydroxyaryl)pentanoic acid wherein the hydroxyaryl radical is a hydroxyphenyl radical and is free from substituents other than alkyl groups of from 1–5 carbon atoms, said resinous polymer containing not more than 15 pentanoic acid units self-condensed therein.

5. The method of claim 4 wherein the reaction is carried out in the presence of acetic anhydride.

References Cited in the file of this patent

UNITED STATES PATENTS

| | | |
|---|---|---|
| 1,923,321 | Meigs | Aug. 22, 1933 |
| 2,359,242 | Perkins | Sept. 26, 1944 |
| 2,444,594 | Day et al. | July 6, 1948 |
| 2,570,513 | Block | Oct. 9, 1951 |
| 2,600,376 | Caldwell | June 17, 1952 |

(Other references on following page)

FOREIGN PATENTS 189,190   Great Britain _____ Nov. 20, 1922

OTHER REFERENCES

Carothers: Collected Papers, Interscience, 1940, pages 86, 87 and 90. (Copy in Scientific Library.)

Bader et al.: Journal of Amer. Chem. Soc., vol. 75, November 1953, pages 5416–5417. (Copy in Scientific Library.)

Bader: Journal of Amer. Chem. Soc., vol. 76, September 1954, pages 4465–4466.